(12) United States Patent
Wilson et al.

(10) Patent No.: US 9,851,737 B1
(45) Date of Patent: Dec. 26, 2017

(54) COMPUTING AN OPERATING PARAMETER OF A UNIFIED POWER FLOW CONTROLLER

(71) Applicant: Sandia Corporation, Albuquerque, NM (US)

(72) Inventors: David G. Wilson, Tijeras, NM (US); Rush D. Robinett, III, Tijeras, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 339 days.

(21) Appl. No.: 14/556,820

(22) Filed: Dec. 1, 2014

Related U.S. Application Data

(60) Division of application No. 13/159,303, filed on Jun. 13, 2011, now Pat. No. 8,930,034, which is a continuation-in-part of application No. 12/633,045, filed on Dec. 8, 2009, now Pat. No. 8,527,247, which is a continuation-in-part of application No. 12/474,349, filed on May 29, 2009, now abandoned, which is a continuation-in-part of application No. 12/052,180, filed on Mar. 20, 2008, now Pat. No. 8,121,708.

(60) Provisional application No. 60/896,043, filed on Mar. 21, 2007.

(51) Int. Cl.
*G06F 19/00* (2011.01)
*G05F 1/67* (2006.01)
*G05B 15/02* (2006.01)

(52) U.S. Cl.
CPC ............... *G05F 1/67* (2013.01); *G05B 15/02* (2013.01)

(58) Field of Classification Search
CPC combination set(s) only.
See application file for complete search history.

(56) References Cited

U.S. PATENT DOCUMENTS

| 6,408,226 | B1 | 6/2002 | Byrne et al. |
| 6,414,274 | B1 | 7/2002 | Goldsmith |
| 6,577,906 | B1 | 6/2003 | Hurtado et al. |

(Continued)

OTHER PUBLICATIONS

L. Gyugyi et al., The Unified power flow controller a new Approch to Power Transmission Control, Ieee vol. 10, No. 2, Apr. 1995, pp. 1085-1097.*

(Continued)

*Primary Examiner* — Kidest Bahta
(74) *Attorney, Agent, or Firm* — Daniel J. Jenkins

(57) ABSTRACT

A Unified Power Flow Controller described herein comprises a sensor that outputs at least one sensed condition, a processor that receives the at least one sensed condition, a memory that comprises control logic that is executable by the processor; and power electronics that comprise power storage, wherein the processor causes the power electronics to selectively cause the power storage to act as one of a power generator or a load based at least in part upon the at least one sensed condition output by the sensor and the control logic, and wherein at least one operating parameter of the power electronics is designed to facilitate maximal transmittal of electrical power generated at a variable power generation system to a grid system while meeting power constraints set forth by the electrical power grid.

6 Claims, 6 Drawing Sheets

(56) References Cited

U.S. PATENT DOCUMENTS

| | | | |
|---|---|---|---|
| 6,670,721 | B2 | 12/2003 | Lof et al. |
| 6,700,802 | B2 * | 3/2004 | Ulinski ............... H02J 3/32 307/66 |
| 6,826,431 | B2 | 11/2004 | Hurtado et al. |
| 6,841,976 | B1 | 1/2005 | Sen et al. |
| 7,117,070 | B2 | 10/2006 | Chow et al. |
| 7,609,158 | B2 | 10/2009 | Banting et al. |
| 7,642,757 | B2 | 1/2010 | Yoon et al. |
| 7,663,268 | B2 | 2/2010 | Wen et al. |
| 7,687,983 | B2 | 3/2010 | Lee et al. |
| 7,747,739 | B2 | 6/2010 | Bridges et al. |
| 7,812,586 | B2 | 10/2010 | Soldano et al. |
| 7,952,232 | B2 | 5/2011 | Burra et al. |
| 2003/0011348 | A1 | 1/2003 | Lof et al. |
| 2006/0229767 | A1 | 10/2006 | Chu et al. |
| 2007/0100506 | A1 | 5/2007 | Teichmann |
| 2007/0217105 | A1 * | 9/2007 | Christensen ........... H02H 3/025 361/89 |
| 2008/0127646 | A1 | 6/2008 | Doland |
| 2012/0232709 | A1 | 9/2012 | Robinette, III et al. |

OTHER PUBLICATIONS

Zunko et al., Basic control of Unifield Power Flow Controller, Ieee, vol. 12, No. 4, Nov. 1997, pp. 1734-1739.*
L. Gyugyi et al. , Unified Power Flow Control concept for Flexible AC Trancmission System, Jul. 1992, vol. 139, IEEE, p. 323-331.*
Anthony, K.H. "Hamilton's Action Principle and Thermodynamics of Irreversible Processes—A Unifying Procedure for Reversible and Irreversible Processes" J. Non-Newtonian Fluid Mechanics, 95 (2001) pp. 291-339.
Boyce, W.E. et al., "Elementary Differential Equations and Boundary Value Problems" 8$^{th}$ Edition, John Wiley and Sons (2005) pp. 450, Problem No. 7.
Carletti, et al., "A Note on Existence and Uniqueness of Limit Cycles for Lienard Systems", Journal of Mathematical Analysis and Applications, 307 (2006) pp. 763-773.
Clark, R.L., et al., "Control of a Three-Degree-of-Freedom Airfoil with Limit-Cycle Behavior", Journal of Aircraft, 37:3 (2000) pp. 533-536.
Gopinath, et al., "Comparative Study of Computational Methods for Limit-Cycle Oscillations", 47$^{th}$ AIAA Structures, Structural Dynamics and Materials Conference, New Port, Rhode Island (2006) pp. 1-12.
Hall, K.C., et al., "Computation of Unsteady Nonlinear Flows in Cascades Using a Harmonic Balance Technique", AIAA Journal, 40:5 (2002) pp. 879-886.
Hill, D. et al., "The Stability of Nonlinear Dissipative Systems", IEEE Transactions on Automatic Control, Oct. 1976, pp. 708-710.
Ko, J., et al., "Nonlinear Control of a Prototypical Wing Section with Torsional Nonlinearity", Journal of Guidance, Control, and Dynamics, 20:6 (1997) pp. 1181-1189.
Kokotovic, et al., "Constructive Nonlinear Control: A Historical Perspective", Automatica 37 (2001) pp. 637-662.
Kristic et al., "Nonlinear and Adaptive Control Design", John Wiley & Sons, Inc. New York 1985.
Lee, B.H., et al., "Flutter of an Airfoil with a Cubic Nonlinear Restoring Force", Journal of Fluids and Structures, 13:1 (1999) 75-101.
Moylan, P.J., "Implications of Passivity in a Class of Nonlinear Systems", IEEE Transactions of Automatic Control, AC-19:4 (1974) pp. 373-381.
Ortega, et al., "Passivity-Based Control of Nonlinear systems: A Tutorial" Proceedings of the American Control Conference, (1997) pp. 2633-2637.
Price, S.K., et al., "Postinstability Behavior of a Two-Dimensional Airfoil with a Structural Nonlinearity", Journal of Aircraft, 13:6 (1994) 1395-1401.
Robinette III, et al., "Collective Systems: Physical and Information Exergies", Sandia National Laboratories, SAND2007-2327 (2007) pp. 1-102.
Robinett III, et al., "Exergy and Entropy Thermodynamic Concepts for Control System Design: Slewing Single Axis", 2006 AIAA Guidance, Navigation and Control Conference (2006) pp. 1-20.
Robinett III, et al., "Exergy and Entropy Thermodynamic Concepts for Nonlinear Control Design", 2006 ASME International Mechanical Engineering Congress & Exposition (2006).
Robinett III, et al., "Exergy and Irreversible Entropy Production Thermodynamic Concepts for Control Design: Nonlinear Regulator Systems", The 8$^{th}$ IASTED International Conference on Control and Applications (2006) pp. 1-8.
Robinett III et al., "Exergy and Irreversible Entropy Production Thermodynamic Concepts for Control Design: Regulators", Proceedings of the 2006 IEEE Conference on Control Applications (2006) pp. 2249-2256.
Robinette III et al., "Exergy Sustainability", Sandia Report SAND2006-2759 (2006) pp. 1-39.
Robinette et al., "Exergy Sustainability for Complex Systems", Inter Journal Complex Systems, 1616, New England Complex Systems Institute (2006) pp. 1-8.
Robinett III, et al., "What is a Limit Cycle", Intl Journal of Control, 81:2 (2008) pp. 1886-1900.
Sabitini, M., "Limit Cycle's Uniqueness for a Class of Plane Systems", Technical Report, UTM 662, Mathematica, Univ. of Trento, Italy (2004).
Slotine, et al., "Applied Nonlinear Control", Prentice Hall, Inc. N.J. (1991) pp.
Willems, J.C., "Dissipative Dynamical Systems Part I: General Theory: Part II: Linear Systems with Quadratic Supply Rates", Archive for Rational Mechanics and Analysis, 45 (1972) pp. 321-393.
Wyatt, J.L., et al., "Energy Concepts in the State-Space Theory of Nonlinear-n-Ports: Part I—Passivity", IEEE Transactions on Circuits and Systems, CAS-28:1 (1981) pp. 48-61.
Wyatt, J.L., et al., "Energy Concepts in the Stat-Space Theory of Nonlinear-n-Ports: Part II—Losslessness", IEEE Transactions on Circuits and Systems, CAS-29:7 (1982) pp. 417-430.

* cited by examiner

COMPUTING AN OPERATING PARAMETER OF A UNIFIED POWER FLOW CONTROLLER

CROSS-REFERENCE TO RELATED APPLICATIONS

This application is divisional of U.S. patent application Ser. No. 13/159,303 filed on Jun. 13, 2011, which is a continuation-in-part of U.S. patent application Ser. No. 12/633,045, filed on Dec. 8, 2009, now U.S. Pat. No. 8,527,247 issued on Sep. 3, 2013, which is a continuation-in-part of U.S. patent application Ser. No. 12/474,349, filed on May 29, 2009, which is a continuation-in-part of U.S. patent application Ser. No. 12/052,180, filed on Mar. 20, 2008, now U.S. Pat. No. 8,121,708 issued on Feb. 21, 2012, which claims the benefit of U.S. Provisional Patent Application No. 60/896,043, filed on Mar. 21, 2007. The entireties of each of these applications are incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A challenging problem that is facing the United States (and other countries) is the integration of power sources that produce varying amounts of power into the existing (and aging) Electric Power Grid (EPG) infrastructures. Examples of power sources that produce varying amounts of power include wind turbines, solar power systems, hydropower systems, geothermal power systems, and other suitable power sources. For instance, power generated by a wind turbine is directly related to rotational speed of the wind turbine, which is based upon wind speeds. As wind speeds vary over time, the rotational speed of the wind turbine will also vary, and thus the power generated by the wind turbine will likewise vary over time. Similarly, solar power systems generate power as a function of an amount of solar radiation received at a collection of solar panels. As the Sun moves across the sky, the solar radiation received at the collection of solar panels will change, and therefore power output by the solar panels will alter. Moreover, a cloud moving in front of the Sun can cause an amount of power generated by a solar power system to decrease. Similarly, hydropower systems can be affected by position of the moon, an amount of water passing through turbines, etc.

The EPG infrastructures include transformers that are configured to step up and/or step down voltages during transmission of electrical power over transmission lines. Various power electronics are also configured to monitor faults in the electronic grid and isolate problems so that a remainder of the electronic grid is not negatively affected by an isolated fault. Generally, the EPG infrastructures are designed to transform and transmit power at certain voltage levels and frequency, and power provided that differs from the voltage levels and frequency can damage power electronics in the EPG. Accordingly, systems that cause power generated from variable power sources to conform to specifications of the EPG must be implemented to facilitate integration of variable power sources with the EPG.

An exemplary system that has been utilized in connection with causing power generated by variable power sources to conform to EPG specifications is a Unified Power Flow Controller (UPFC). A UPFC may include a plurality of different types of power electronics devices. In general, the UPFC includes sensors, actuators, and power storage devices (such as batteries, capacitors, or the like). If magnitude of power provided from a variable power source is too low, the UPFC pulls power from storage to cause the power to be at a desired level. Alternatively, if magnitude of power provided from the variable power source is higher than desired, the UPFC causes excess power to be retained in the power storage devices. The end result is that power generated by a variable power source can be provided to an EPG.

Currently, when designing a UPFC, available power electronics hardware is assembled, and the UPFC is designed to control power flow from a variable power source to the EPG using the assembled hardware. This leads to less than optimal utilization of power generated by variable power generation systems.

SUMMARY

The following is a brief summary of subject matter that is described in greater detail herein. This summary is not intended to be limiting as to the scope of the claims.

In an exemplary embodiment, described herein is a method that comprises the act of receiving power constraints for an existing power grid that desirably receives power generated from a variable power generation system in accordance with the power constraints. The method further comprises the act of computing at least one operating parameter of a Unified Power Flow Controller that facilitates optimal provision of electric power generated by the variable power generation system to the existing power grid in accordance with the power constraints for the existing power grid.

In another exemplary embodiment, described herein is a Unified Power Flow Controller that includes a sensor that outputs at least one sensed condition. The Unified Power Flow Controller further includes a processor that receives the at least one sensed condition and a memory that comprises control logic that is executable by the processor. Moreover, the Unified Power Flow Controller includes power electronics that comprise power storage, wherein the processor causes the power electronics to selectively cause the power storage to act as one of a power generator or a load based at least in part upon the at least one sensed condition output by the sensor and the control logic, and wherein at least one operating parameter of the power electronics is designed to facilitate maximal transmittal of electrical power generated at a variable power generation system to a grid system while meeting power constraints set forth by the electrical power grid.

Other aspects will be appreciated upon reading and understanding the attached figures and description.

DETAILED DESCRIPTION

Figure 1:
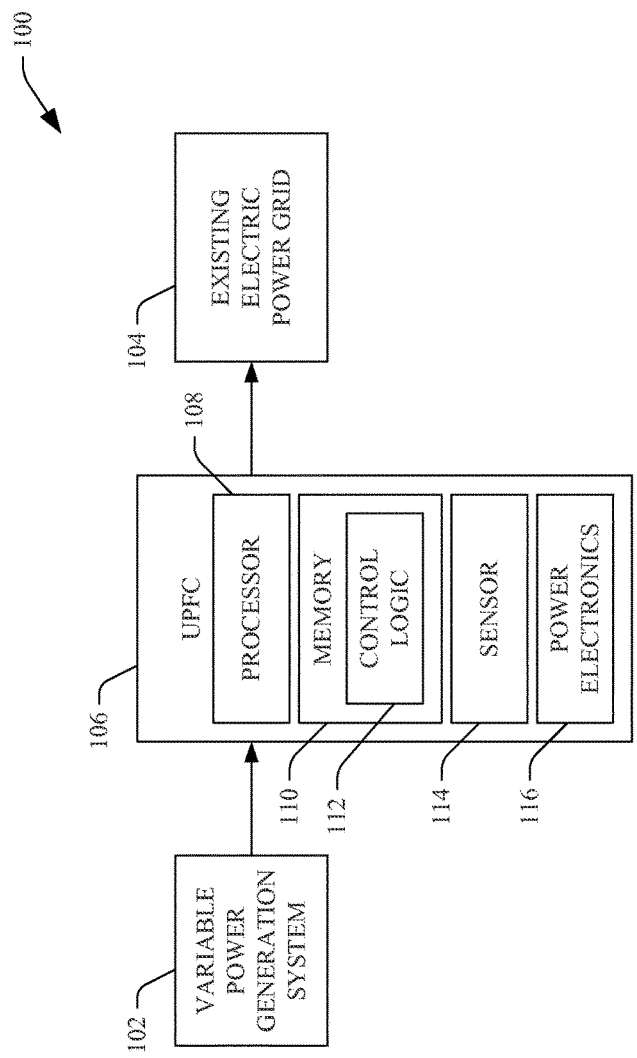
FIG. 1 is a functional block diagram of an exemplary system that facilitates integrating a variable power generation source with an existing power grid by way of a specially designed Unified Power Flow Controller.

Various technologies pertaining to designing a Unified Power Flow Controller (UPFC) as well as designing control algorithms for the UPFC when the UPFC is configured to interface a variable power generating source with a conventional, existing electric power grid (EPG) will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. In another exemplary embodiment, a "component" or "system" can be hardware that is configured to perform particular functionality, such as a field programmable gate array (FPGA).

With reference now to FIG. 1, an exemplary system 100 that facilitates integrating variable power sources with an existing electric power grid (EPG). The system 100 comprises a variable power generation system 102, which can be any suitable power generation system that generates variable amount of power, including but not limited to wind turbine farms, solar farms (which include numerous panels of photovoltaic cells), hydropower systems, geothermal power generation systems, or other suitable power generation systems. The system 100 further comprises an EPG 104, wherein the EPG 104 is desirably provided with electrical power output by the variable power generation system 102. The EPG 104 is configured to perform a variety of tasks relating to electricity generation, transmission, distribution, and control. To integrate the variable power generation system 102 with the EPG 104, however, the power generated from the variable power generation system 102 desirably conforms with some predefined specifications of the EPG 104, such as voltage magnitude, phase, and frequency.

The system 100 further comprises a Unified Power Flow Controller (UPFC) 106 that is configured to receive power output from the variable power generation system 102, and thereafter perform one or more actions to provide electrical power to the EPG 104 in a form that meets the specifications of the EPG 104. The UPFC 106, as will be understood by one skilled in the art, is an electric system that provides fast-acting reactive power compensation on electricity transmission lines. Accordingly, while not shown, the variable power generation system 102 can be operably coupled to the EPG 104 by way of a high voltage transmission line, and the UPFC 106 can be positioned on such line to cause power to be provided to the EPG 104 in accordance with the specifications of the EPG 104.

The UPFC 106 includes a processor 108 and a memory 110 that comprises instructions that are executed by the processor 108. The instructions can be in the form of control logic 112. The UPFC 106 further comprises at least one sensor 114 that senses at least one condition pertaining to electrical power generated by the variable power source 102. This condition may be voltage magnitude, frequency, current magnitude, frequency, heat of a transmission line, or any other suitable condition that may be indicative of power flow received at the UPFC 106. The UPFC 106 further comprises power electronics 116 that can act as both a generator and a load (energy storage) in the UPFC 106. In other words, the power electronics 116 can act to retain energy as well as dissipate energy. The power electronics 116 may be or comprise a Flexible AC Transmission System (FACTS). In another example, the power electronics 116 may be or include a battery, a capacitor, a flywheel, or other suitable device that can act to retain and dissipate energy.

The control logic 112, when executed by the processor 108, acts to control the power electronics 118 (and other mechanical and/or electromechanical components of the UPFC 106) based at least in part upon data received from the sensor 114. In an example, the control logic 112 can be or include non-linear control logic. Specifically, the sensor 114 senses at least one condition pertaining to the power received from the variable power generation system 102, and the processor 108 transmits commands to the power electronics 116 that cause the power electronics 116 to retain or dissipate energy based at least in part upon the at least one condition sensed by the sensor. The power electronics 116 can further be caused by the processor 108 to perform functions pertaining to modifying frequency of power and other acts. The output of the UPFC 106 is AC power that accords to the specifications of the power grid 104.

The power electronics 116, as will be described in greater detail below, are designed with specifications that act to substantially optimize an amount of electrical power that is provided to the EPG 104 by way of the UPFC 106. For instance, the specifications for the UPFC 106 can include an amount of capacity for retaining energy, a rate that energy can be retained, a rate that energy can be dissipated, how quickly the power electronics 116 can be altered from acting as a generator to acting as a load and vice versa, amongst other specifications. Thus, as will be described below, the UPFC 106 can be designed with specifications that are particularly configured to the variable power generation system 102 and the constraints set forth by the EPG 104, which is in contrast to the conventional approach of utilizing whatever power electronics are available, thereby sacrificing system efficiency. Additionally, the control logic 112 can be designed by taking into consideration the determined specifications.

Figure 2:
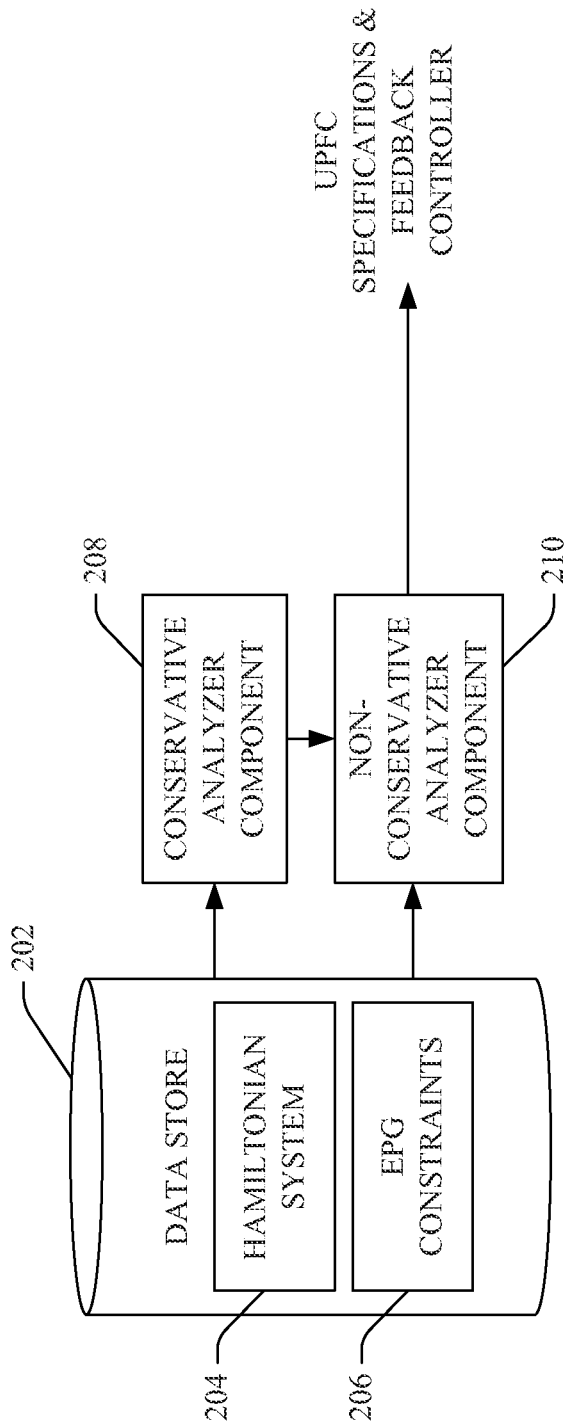
FIG. 2 is a functional block diagram of an exemplary system that facilitates determining at least one parameter of a Unified Power Flow Controller to maximize an amount of power that is generated by a variable power generation system and provided to an existing power grid.

Now referring to FIG. 2, an exemplary system 200 that facilitates computing the UPFC specifications discussed above as well as parameters for the control logic is illustrated. The system 200 comprises a data store 202, which may be memory of a computing apparatus, a hard drive, or other suitable electronic data storage. The variable power generation system 102 may, from time to time, have a transient fault associated therewith. Swing equations have been developed to model the behavior of variable power generation systems under transient conditions. Accordingly, for instance, swing equations have been developed that model the behavior of wind turbines when operating under transient conditions. The data store 202 comprises a Hamiltonian system 204, wherein the swing equations for the variable power generation system 102 are formulated as the Hamiltonian system 204. The Hamiltonian system 204 can be configured with externally applied non-conservative forces. The data store 202 further comprises EPG constraints 206, which describe constraints of the EPG 104 (including but not limited to voltage magnitude and frequency that is acceptable to the EPG 104).

A two-step process can be undertaken in connection with determining desired performance of the UPFC 106 to enable substantially maximum power output of the variable power generation system 102 while meeting the constraints of the EPG 104 on voltage magnitude, frequency, and phase. The system 200 comprises a conservative analyzer component 208 that is configured to perform the first step of the two-step process. The conservative analyzer component 208 can analyze the Hamiltonian system 204 as a conservative, natural Hamiltonian system with no externally applied non-conservative forces. The Hamiltonian surface of the swing equations is related to the Equal-Area Criterion and the Potential Energy Boundary Surface (PEBs) method to formulate the nonlinear transient stability problem by recognizing that the path of the Hamiltonian system 204 is constrained to the Hamiltonian surface. This formulation demonstrates the effectiveness of proportional feedback control to expand the stability region. Further, conservative analyzer component 208 can consider the non-conservative power flows to determine the path of the Hamiltonian system 204 across the Hamiltonian surface, which can be used to determine stability regions and transient performance.

The system 200 further comprises a non-conservative analyzer component 210 that analyzes the Hamiltonian system 204 as a natural Hamiltonian system with externally applied non-conservative forces. The non-conservative analyzer component 210 can compute the time derivative of the Hamiltonian system 204 to produce the work/rate (power flow) equations which can be used to ensure balanced power flows from the variable power generation system 102 to the EPG 104. The non-conservative analyzer component 210 can further employ the Second Law of Thermodynamics to partition the power flow into three types: 1) the energy storage rate of change; 2) power generation; and 3) power dissipation. The Melnikov number for this class of Hamiltonian systems is directly related to the balance of power flows for the stability (limit cycles) of natural Hamiltonian systems with externally applied non-conservative forces. The non-conservative analyzer component 210 can further apply the Second Law of Thermodynamics to the power flow equations to determine the stability boundaries (limit cycles) of the variable power generation system 102, and thereby enable design of the control logic 112 such that the control logic 112 acts as a feedback controller that meets the stability requirements while substantially maximizing the power generation and flow to the EPG 104. In summary, the conservative analyzer component 208 and the non-conservative analyzer component 210 can act in conjunction to ascertain specifications for the UPFC 106 and the control logic 112 (as a feedback controller) based upon concepts of Hamiltonian systems, power flow, exergy rate (the maximum work that can be extracted from an energy flow), and entropy rate.

Additional detail pertaining to operations of the conservative analyzer component 208 and the non-conservative analyzer component 210 are now provided. For the purposes of explanation, the variable power generation system 102 is assumed to be a wind turbine in the discussion below; it is to be understood, however, that the variable power generation system 102 can be any suitable variable power generation system.

Swing equations for a wind turbine are as follows:

$$T_m - T_e = J\dot{\omega}_{RM} + B\omega_{RM}, \tag{1}$$

where $T_m$ is the mechanical turbine torque (N–m), $T_e$ is the electromagnetic counter torque (N–m), J is the mass polar moment of inertia, $\omega_{RM}$ is the rotor shaft velocity in mechanical rotations/second, and B is a damping force coefficient. Additionally, $$\omega_{RM} = \frac{\omega}{N_p/2}; \omega = \omega_{ref} + \dot{\delta} \tag{2}$$

and $$T_m - T_e = \hat{J}(\dot{\omega}_{ref} + \ddot{\delta}) + \hat{B}(\omega_{ref} + \dot{\delta}), \tag{3}$$

where $\omega_{ref}$ is a reference angular velocity (which can be set to zero, for example) and $\delta$ is a power angle measured in electrical radians. The Hamiltonian system 204 can be defined as follows:

$$\mathcal{H} = \frac{1}{2}\hat{J}\omega^2, \tag{4}$$

such that the conservative analyzer component 208 can analyze the Hamiltonian system as a conservative, natural Hamiltonian system with no externally applied non-conservative forces. The power flow or Hamiltonian rate is thus as follows:

$$\dot{\mathcal{H}} = J\dot{\omega}\omega \tag{5}$$
$$= [T_m - T_e - \hat{B}(\omega_{ref} + \dot{\delta})](\omega_{ref} + \dot{\delta})$$
$$= P_m - P_e - \hat{B}\omega^2,$$

where $P_m$ is mechanical turbine power (W) (which is constant), and $P_e$ is electromagnetic counter torque (W). The approximate power flows from the generator, mechanical controls, and the UPFC 106 can then be considered:

$$P_m = P_{m_c} + u_m(\omega_{ref} + \dot{\delta}) \tag{6}$$

$$P_e = P_{e_c} \sin\delta + u_{e1}P_{e_c}\sin\delta - u_{e2}P_{e_c}\cos\delta, \tag{7}$$

where $u_m$ is a control law for the mechanical (wind) turbine and $u_{e1}$ and $u_{e2}$ are control laws for the UPFC, and $P_{m_c}$ and $P_{e_c}$ are static values of power for the mechanical turbine and the electromagnetic counter torque (W), respectively, that are desirably increased to optimize power output.

Starting with the following reference power flow equation:

$$T_{m_{ref}} - T_{e_{ref}} = \hat{J}\dot{\omega}_{ref} + \hat{B}\omega_{ref}, \quad (8)$$

where $T_{m_{ref}}$ is a reference mechanical turbine torque, $T_{e_{ref}}$ is a reference electromagnetic counter torque, $\omega_{ref}$=constant and $\omega_{ref} \gg \dot{\delta}$, solving for the acceleration term provides the following:

$$\hat{J}\ddot{\delta} = -\hat{B}\dot{\delta} + P_{m_e} + u_m \omega_{ref} - P_{e_c}[(1+u_{e_1})\sin \delta - u_{e_2} \cos \delta]. \quad (9)$$

The non-conservative analyzer component 210 can then define the Hamiltonian system 204 as follows:

$$\mathcal{H} = \frac{1}{2}\hat{J}\dot{\delta}^2. \quad (10)$$

The derivative of the Hamiltonian then becomes:

$$\dot{\mathcal{H}} = \hat{J}\dot{\delta}\ddot{\delta} \quad (11)$$

$$= \left[-\hat{B}\dot{\delta} + P_{m_c} + u_m \omega_{ref} - P_{e_c}((1+u_{e_1})u_{e_2}\cos\delta)\right]\dot{\delta}.$$

If it is assumed that a one machine infinite bus (OMIB) is combined with the UPFC 106 and $u_m$=0, then the following can hold:

$$\hat{J}\ddot{\delta} + P_{e_c} \sin \delta - P_{m_c} = -\hat{B}\dot{\delta} - P_{e_c}[u_{e_1} \sin \delta - u_{e_2} \cos \delta]. \quad (12)$$

Thereafter, the following nonlinear PID control laws are selected:

$$u_{e_1} = K_{P_e} \cos \delta_s + K_{D_e} \sin \delta \dot{\delta} + K_{I_e} \sin \delta \int_0^t \Delta\tau \quad (13)$$

$$u_{e_2} = K_{P_e} \sin \delta_s - K_{D_e} \cos \delta \dot{\delta} - K_{I_e} \cos \delta \int_0^t \Delta\tau, \quad (14)$$

where $\Delta = \delta - \delta_s$, $K_{P_e}$ is a tunable proportional gain, $K_{D_e}$ is a tunable derivative gain, and $K_{I_e}$ is a tunable integral gain. Finally, Eqs. (13) and (14) can be substituted into Eq. (12) to yield the following:

$$\hat{J}\ddot{\delta} + [P_{e_c} \sin \delta - P_{m_c}] + P_{e_c} K_{P_e} \sin(\delta - \delta_s) = -[\hat{B}\dot{\delta} - P_{e_c} K_{D_e}]$$
$$\dot{\delta} - K_{I_e} \int_0^t \sin(\delta - \delta_s) d\tau. \quad (15)$$

The static condition then becomes the following:

$$\mathcal{H} = \frac{1}{2}\hat{J}\dot{\delta}^2 + P_{e_c}(1 + K_{P_e})(1 - \cos(\delta - \delta_s)), \quad (16)$$

with H being positive definite, and $$\delta_s = \sin^{-1}(P_{m_c}/P_{e_c}). \quad (17)$$

The dynamic stability condition for a passively stable control designs yields the following:

$$\oint_\tau [\hat{B} + P_{e_c} K_{D_e}] \dot{\delta}^2 dt > -\oint_\tau [P_{e_c} K_{I_e} \int_0^t (\delta - \delta_s) d\tau] \dot{\delta} dt. \quad (18)$$

Accordingly, it is apparent that the nonlinear PID controller for the UPFC 106 expands the region of stability by increasing the PEBS from $P_{e_c}$ to $P_{e_c}(1+K_{P_e})$ and enabling the UPFC 106 to respond more quickly to sensed conditions.

A feed forward control term can be added to the UPFC controllers, Eqs. (13) and (14), for $u_{e_1}$ and $u_{e_2}$, respectively, as follows:

$$u_{e_1} = u_{e_1} - [(P_{m_{ref}} - P_m(t))/P_{max}] \sin \delta \quad (19)$$

$$u_{e_2} = u_{e_2} + [(P_{m_{ref}} - P_m(t))/P_{max}] \cos \delta, \quad (20)$$

where $P_{m_{ref}}$ is designed to emulate a constant input and $P_m(t)$ can become variable such as from wind or solar generation. Through simulation, utilizing a model of the EPG 104 (including the constraints 206) as well as the controller and control terms described above, parameters of the UPFC 106 that allow for optimized power transfer from the variable power generation system 102 to the EPG 104 can be ascertained. In an example, a computer-implemented heuristic model can be employed to automatically locate at least one specification corresponding to the UPFC 106 that can be utilized to design the UPFC 106 to substantially optimize power generated from the variable power generation system 102 that is received at the EPG 104.

Figure 4:
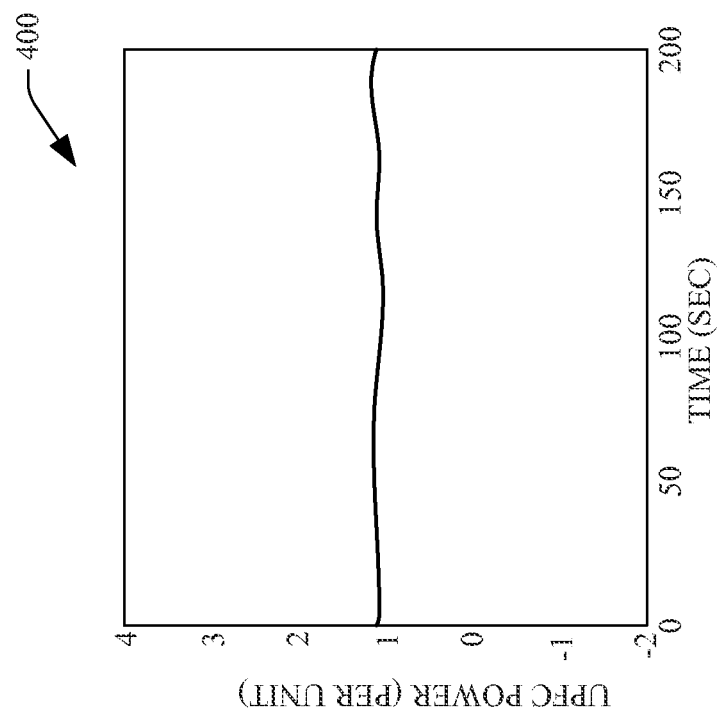
FIG. 4 is an exemplary plot depicting power output by a Unified Power Flow Controller.
Figure 3:
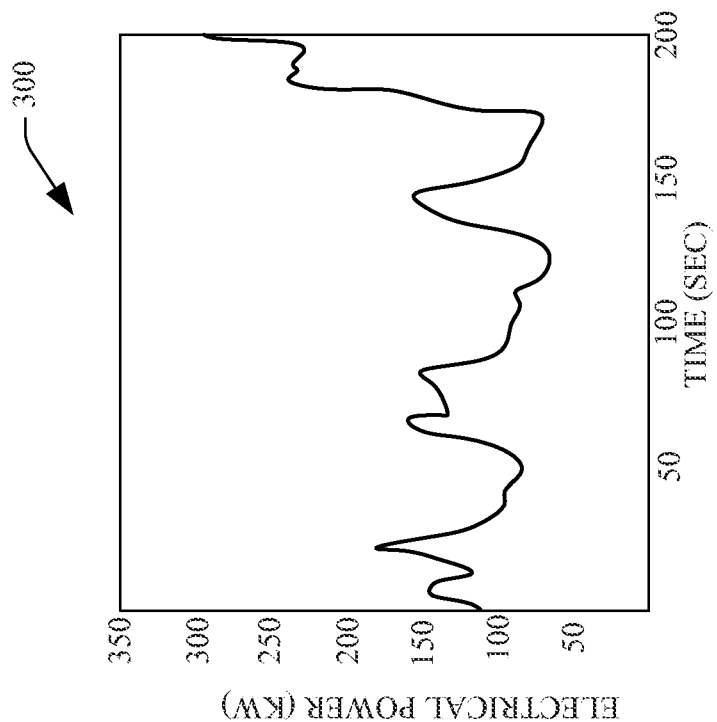
FIG. 3 is an exemplary plot depicting variable power generated by a variable power generation system.

Referring now to FIG. 3, an exemplary graph 300 that depicts a variable amount of power that can be output by the variable power generation system 102 over time is illustrated, wherein such power can be received by the UPFC 106. With reference to FIG. 4, power output by the UPFC 106 and delivered to the EPG 104 is shown. It can be ascertained that the amount of power provided to the EPG 104 from the UPFC 106 is constant (e.g., within constraints set forth by the EPG 104).

Figure 5:
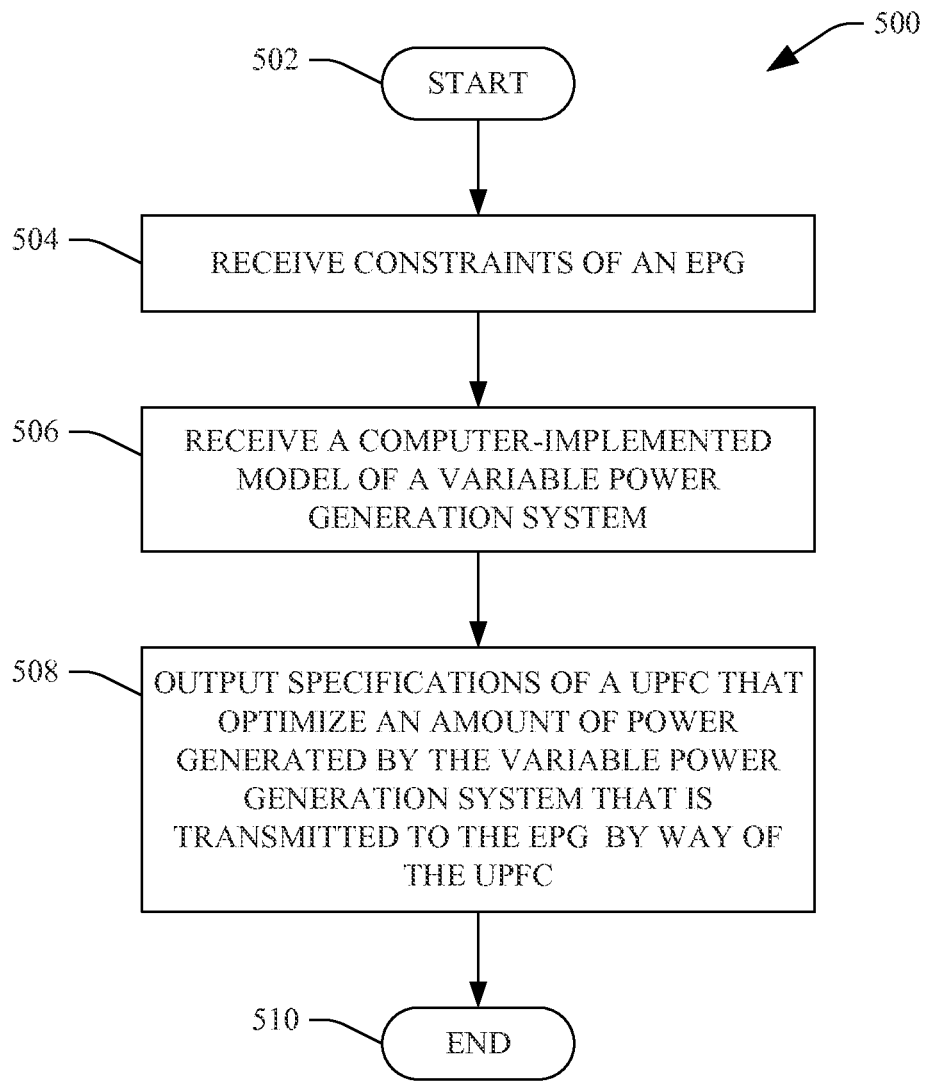
FIG. 5 is a flow diagram that illustrates an exemplary methodology for computing at least one parameter of a Unified Power Flow Controller.
Figure 6:
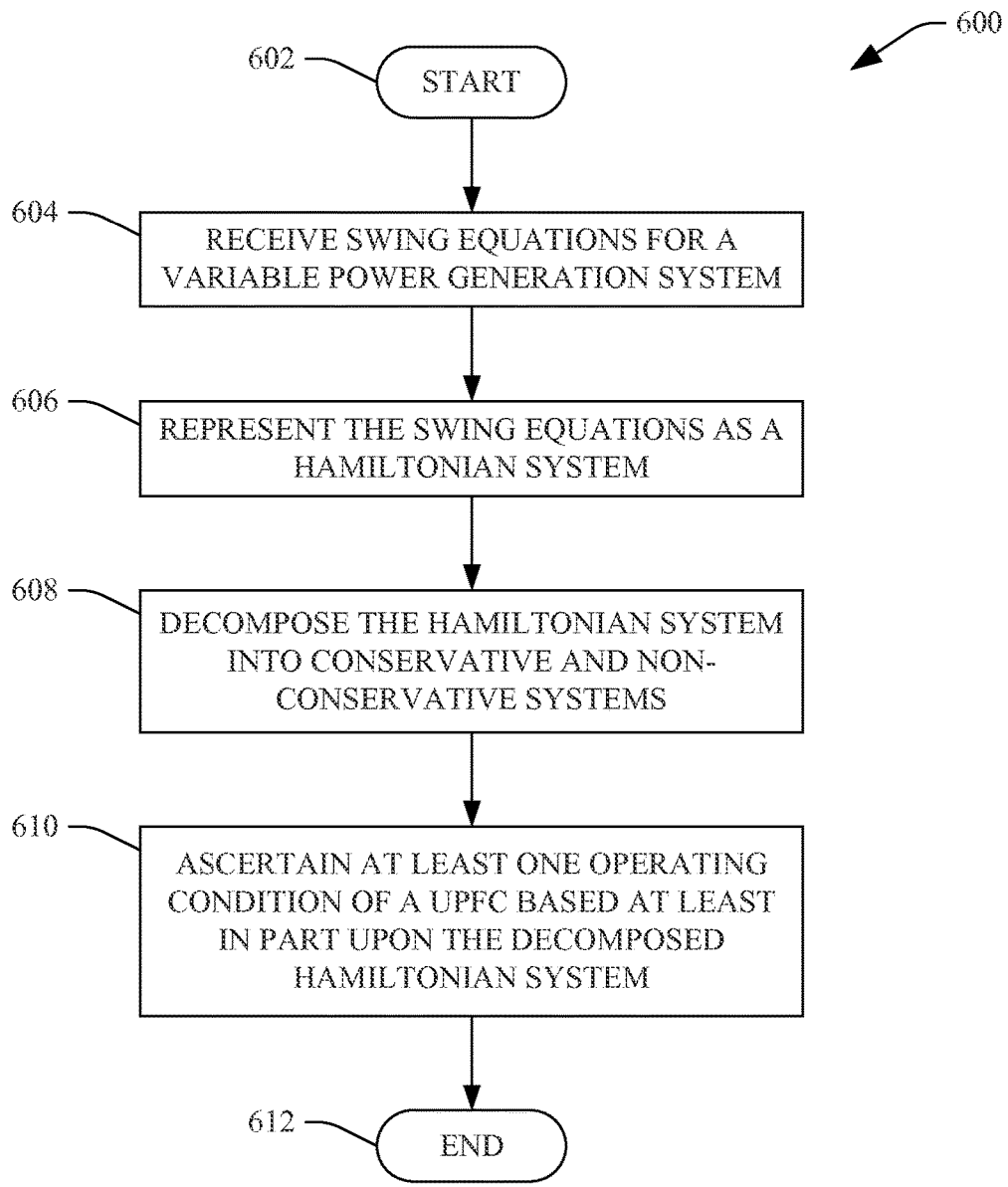
FIG. 6 is a flow diagram that illustrates an exemplary methodology for ascertaining at least one operating parameter of a Unified Power Flow Controller.

With reference now to FIGS. 5-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Turning solely to FIG. 5, an exemplary methodology 500 that facilitates determining needed performance of a UPFC to enable optimal power output of variable power generation system while meeting constraints of an EPG (e.g., with respect to power frequency and phase) is illustrated. The methodology 500 starts at 502, and at 504 constraints of an EPG are received. In an example, these constraints can be constraints with respect to power frequency, phase, magnitude, or the like.

At 506, a computer-implemented model of a variable power generation system is received. As described above, this computer-implemented model can be or include swing equations that describe behavior of the system under transient conditions.

At 508, specifications of the UPFC that optimize the power output of the variable power generation system while meeting the constraints of the EPG are determined. The specifications can be a function of three different types of power flow that can be ascertained through application of the Second Law of Thermodynamics to derived work/rate (power flow) equations: the energy storage rate of change; power generation; and power dissipation. Accordingly, parameters such as speed of transition between a load and a generator, an amount of storage, and the like can be ascertained to allow for optimal power generation. The methodology 500 completes at 510.

Now referring to FIG. 6, an exemplary methodology 600 that facilitates ascertaining at least one operating condition of a UPFC that is desirably employed to provide relatively constant power to an EPG from a variable power generation system is illustrated. The methodology 600 starts at 602, and at 604 swing equations for a variable power generation system are received. At 606, the swing equations are represented as a Hamiltonian system, and at 608 the Hamiltonian system is decomposed into conservative and non-conservative Hamiltonian systems. At 610, at least one operating condition of a UPFC is ascertained based at least in part upon the decomposed Hamiltonian system. The methodology 600 completes at 610.

Figure 7:
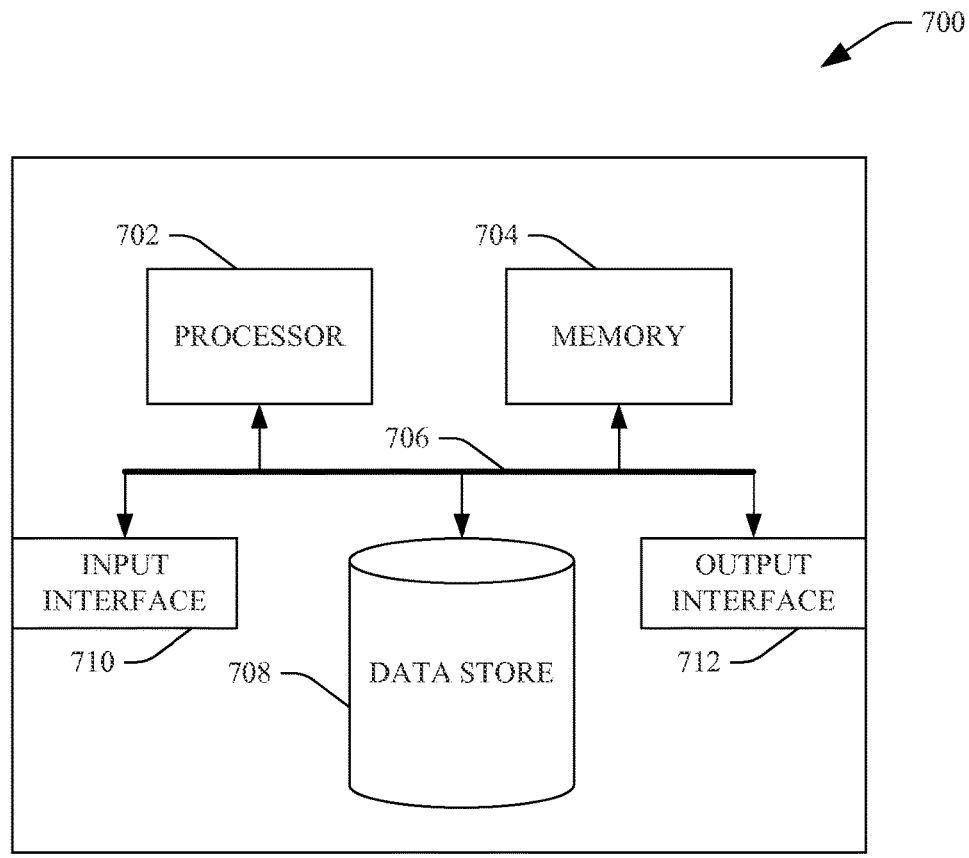
FIG. 7 is an exemplary computing system.

Now referring to FIG. 7, a high-level illustration of an exemplary computing device 700 that can be used in accordance with the systems and methodologies disclosed herein is illustrated. For instance, the computing device 700 may be used in a system that supports designing UPFCs. In another example, at least a portion of the computing device 700 may be used in a system that supports causing power generated by a variable power generation system to be provided in constant form to an EPG. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 702 may access the memory 704 by way of a system bus 706.

The computing device 700 additionally includes a data store 708 that is accessible by the processor 702 by way of the system bus 706. The data store may be or include any suitable computer-readable storage, including a hard disk, memory, etc. The computing device 700 also includes an input interface 710 that allows external devices to communicate with the computing device 700. For instance, the input interface 710 may be used to receive instructions from an external computer device, a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A Unified Power Flow Controller, comprising:
    a sensor that outputs at least one sensed condition of a variable power generation system power output;
    a processor that receives the at least one sensed condition;
    a memory that comprises control logic that is executable by the processor; and
    power electronics that comprise power storage,
    wherein the processor causes the power electronics to selectively cause the power storage to act as one of a power generator or a load based at least in part upon the at least one sensed condition output by the sensor and determined by the control logic, and
    wherein at least one operating parameter of the power electronics is designed to facilitate maximal transmittal of electric power generated at a variable power generation system to an electric power grid while meeting power constraints set forth by the electric power grid; and
    wherein the Unified Power Flow Controller determines if the variable power generation system power output can be provided to the electric power grid with or without supplement or alteration from the power storage by adding additional power or providing a load to reduce the amount of power provided to the grid, respectively.

2. The Unified Power Flow Controller of claim 1, wherein the power storage is one of a battery, a capacitor, or a flywheel.

3. The Unified Power Flow Controller of claim 1, wherein the power electronics comprise a Flexible AC Transmission system.

4. The Unified Power Flow Controller of claim 1, wherein the control logic comprises a nonlinear controller.

5. The Unified Power Flow Controller of claim 1, wherein the at least one sensed condition is selected from a group consisting of voltage magnitude, frequency, current magnitude and heat of a transmission line.

6. The Unified Power Flow Controller of claim 1, wherein the power electronics modify frequency of the variable power generation system power output.

* * * * *